United States Patent [19]
Ohya et al.

[11] Patent Number: 4,699,846
[45] Date of Patent: Oct. 13, 1987

[54] HEAT-RESISTANT AND OIL-RESISTANT LAMINATE FILM AND PROCESS FOR PREPARING THE SAME

[75] Inventors: Masaki Ohya; Yoshiharu Nishimoto; Kunio Shibuya, all of Iwaki, Japan

[73] Assignee: Kureha Kagaku Kogyo Kabushiki Kaisha, Tokyo, Japan

[21] Appl. No.: 625,233

[22] Filed: Jun. 27, 1984

[30] Foreign Application Priority Data

Jul. 1, 1983 [JP] Japan ................................ 58-119946

[51] Int. Cl.⁴ ....................... B32B 27/08; B65D 85/00
[52] U.S. Cl. ................................. 428/516; 156/244.13; 156/244.17; 156/275.5; 264/22; 264/171; 264/173; 264/177.17; 426/127; 426/129; 428/518; 428/520
[58] Field of Search ...................... 156/244.13, 244.17, 156/275.5; 264/22, 171, 173, 176 R, 177.17; 426/127, 129; 428/516, 518, 520

[56] References Cited

U.S. PATENT DOCUMENTS

| 4,104,404 | 8/1978 | Bieler et al. | 428/516 |
| 4,178,401 | 12/1979 | Wienberg et al. | 428/516 |
| 4,495,249 | 1/1985 | Ohya et al. | 428/516 |
| 4,525,414 | 6/1985 | Ohya et al. | 428/516 |
| 4,547,433 | 10/1985 | Ohya et al. | 428/516 |

FOREIGN PATENT DOCUMENTS

| 0003635 | 8/1979 | European Pat. Off. . |
| 1372805 | 8/1964 | France . |
| 108280 | 1/1983 | Japan . |
| 1480204 | 7/1977 | United Kingdom . |
| 2040804 | 9/1980 | United Kingdom . |

Primary Examiner—James C. Cannon
Attorney, Agent, or Firm—Oblon, Fisher, Spivak, McClelland & Maier

[57] ABSTRACT

Disclosed herein are a heat-resistant and oil-resistant laminate film comprising gas-barrier resin layer(s), thermoplastic resin layer(s) different from a gas-barrier resin and adhesive layer(s) disposed between the gas-barrier resin layer and the thermoplastic resin layer, produced by co-extruding a gas-barrier resin, a thermoplastic resin and an adhesive composition and irradiating the co-extruded laminate, the total number of the layers of the laminate film being not less than 3, and the adhesive layer comprising a cross-linked polymer and the adhesive composition consisting essentially of 100 parts by weight of a melt-extrudable adhesive resin and 0.1 to 50 parts by weight of a radiation-sensitive compound, and a process for producing the heat-resistant and oil-resistant laminate film.

12 Claims, No Drawings

HEAT-RESISTANT AND OIL-RESISTANT LAMINATE FILM AND PROCESS FOR PREPARING THE SAME

BACKGROUND OF THE INVENTION

The present invention relates to a heat-resistant and oil-resistant laminate film and a process for preparing the same, and in detail, relates to the laminate film showing an improved heat-resistance and oil-resistance, having an adhesive layer made of a composition consisting essentially of a melt-extrudable adhesive resin and a radiation-sensitive compound and cross-linked by radiation treatment, and a process for preparing the laminate film.

More in detail, the present invention relates to a heat-resistant and oil-resistant laminate film comprising gas-barrier resin layer(s), thermoplastic resin layer(s) different from a gas-barrier resin and adhesive layer(s) disposed between the gas-barrier resin layer and the thermoplastic resin layer, produced by co-extruding a gas-barrier resin, a thermoplastic resin and an adhesive composition and irradiating the co-extruded laminate, the total number of the layers of the laminate film being not less than 3, and the adhesive layer comprising a cross-linked polymer and the adhesive composition consisting essentially of 100 parts by weight of a melt-extrudable adhesive resin and 0.1 to 50 parts by weight of a radiation-sensitive compound, and a process for preparing a coextruding a gas-barrier resin, a thermoplastic resin and an adhesive composition consisting essentially of 100 parts by weight of a melt-extrudable adhesive resin and 0.1 to 50 parts by weight of radiation-sensitive compound(s) in a configuration wherein an adhesive layer is disposed between a gas-barrier resin layer and a thermoplastic resin layer, thereby forming a multi-layered laminate consisting of not less than three layers, and irradiating the thus formed multi-layered laminate to cross-link the melt-extrudable adhesive resin.

In recent years, the demands for supplying heat-resistant and oil-resistant plastic packaging film have been increased, and particularly, those for supplying heat-resistant and oil-resistant packaging film for distribution and preservation for a long time period of foodstuffs containing much amount of animal- and vegetable oils and fat have been increased accompanying the qualitative improvement and diversification of the public's diet.

Not only the heat-resistance and oil-resistance, but also the properties as a gas-barrier, a heat-seal and a mechanical strength are demanded of such plastic packaging film for such foodstuffs and accordingly, the packaging film of a single layer cannot respond to such demands at all.

For those demands, laminate films produced by laminating several single layers respectively having various properties one after another, or produced by coextruding a plurality of layers respectively having various properties have been offered, however, since the adhesion between the layers showing mutually different properties is not necessarily favorable, there are many cases where it is necessary to use an adhesive layer between such layers.

Even in the case where a foodstuff containing animal- and/or vegetable oils and fats, for instance, raw meat, processed meat, cheese and the like, is packaged with a laminate film having conventional adhesive layer(s) and heat-resistant and oil-resistant outer layer(s) and the thus packaged foodstuff is subjected to sterilizing treatment at a high temperature, there are caused many defects as follows due to the poor resistance of the conventional adhesive layer(s) against heat and oil.

Namely, the peeling of the layer(s) occurs at the adhesive layer (s), the slipping occurs between the layers during the sterilizing treatment at a high temperature resulting in the remarkably damaged appearance of the package such as the increased degree of cloudiness caused by interfacial minute unevenness, and the minute wrinkles on the outermost surface occur.

Furthermore, at present when the conditions in sterilization have come to be severer than ever, a laminate film provided with an adhesive layer of improved resistance to heat and oil is eagerly demanded Among the studies for obtaining an adhesive resin of improved resistance to heat and oil, there is a method of cross-linking the adhesive resin. The objective of the method is the improvement of the heat-resistance and oil-resistance of the adhesive layer by cross-linking the adhesive resin, thereby enlarging the domain of rubber-like elasticity thereof to the high temperature side to prevent the flow of the adhesive resin and to prevent the breakage thereof and the reduction of the strength and the peeling at break thereof at a high temperature due to the animal- and/or vegetable oils and fats which have been derived from the oily and/fatty foodstuff and have been taken up by the adhesive resin layer.

In general, as a method for cross-linking the adhesive resin layer, (i) the method of admixing an organic peroxide into the adhesive resin, (ii) the method of using an adhesive resin ionically cross-linkable and (iii) the method of cross-linking by silane-coupling have been proposed. However, the first method is not favorable because of the decomposition of the organic peroxide and the occurrence of bubbling during the coextrusion of the layers of laminate, the second method frequently causes the slipping between the layers of the laminate film by the breaking of the cross-linking at a high temperature as in the case of treatment in a retort resulting in the flow of the adhesive resin, and the silane-coupling has demerits of being complicated in operation, of requiring the treatment thereof with a hot water and steam, of causing contraction of the laminate film in the case where the laminate film is shrinkable and still requiring a long time of treatment thereof.

In particular, in Japanese patent application Laying Open No. 57-212282 (1982), a method of irradiating an electron beam onto a laminate film is disclosed by which the specified adhesive resin is subjected to cross-linking, thereby solidifying the adhesive layer. More in detail, according to the thus disclosed method, an adhesive agent containing a polymeric substance comprising a modified polymer of a specified acrylate ester having a glycidyl group is painted on the adhesive layer, and after laminating and sticking the other layer thereon or laminating thereof by extrusion coating thereon, the thus laminate film is irradiated by the electron beam.

However, the application of such a modified polymeric substance of a specified acrylate ester having glycidyl group as the adhesive layer is unsuitable for preparing the laminate film by coextrusion method because of the occurrence of gelation on melt-extruding of the adhesive resin layer resulting in the inability to continue the operation for a long time period and the formation of melt-flucture due to the large difference of melt-viscosities in the interface of the laminated layers.

As a result of the present inventors' studies for a favorable method of cross-linking the adhesive resin in the preparation of a laminate film being excellent in gas-barrier property, heat-resistance and oil-resistance, it has been found by the present inventors that a laminate film excellent in heat-resistance and oil-resistance can be obtained by coextruding the gas-barrier resin, the thermoplastic resin and the adhesive composition consisting essentially of a melt-extrudable resin and a radiation-sensitive compound and irradiating the extruded laminate, and the present inventors have attained the present invention.

SUMMARY OF THE INVENTION

In a first aspect of the present invention, there is provided a heat-resistant and oil-resistant laminate film comprising gas-barrier resin layer(s), thermoplastic resin layer(s) different from the gas-barrier resin and adhesive layer(s) disposed between the gas-barrier resin layer and the thermoplastic resin layer, produced by coextruding a gas-barrier resin, a thermoplastic resin and an adhesive composition and irradiating the coextruded laminate, the total number of the layers of the laminate film being not less than 3, and the adhesive layer comprising a cross-linked polymer and the adhesive composition consisting essentially of 100 parts by weight of a melt-extrudable adhesive resin and 0.1 to 50 parts by weight of a radiation-sensitive compound.

In a second aspect of the present invention, there is provided a process for preparing a heat-resistant and oil-resistant laminate film, comprising the steps of coextruding a gas-barrier resin, a thermoplastic resin and an adhesive composition consisting essentially of 100 parts by weight of a melt-extrudable adhesive resin and 0.1 to 50 parts by weight of radiation-sensitive compound(s) in a configuration wherein an adhesive layer is disposed between a gas-barrier resin layer and a thermoplastic resin layer, thereby forming a multi-layered laminate consisting of not less than three layers, and irradiating the thus formed multi-layered laminate to cross-link the melt-extrudable adhesive resin.

DETAILED DESCRIPTION OF THE INVENTION

The heat-resistant and oil-resistant laminate film according to the present invention comprises gas-barrier resin layer(s), thermoplastic resin layer(s) different therefrom and adhesive layer(s) disposed between the gas-barrier resin layer and the thermoplastic layer, the total number of the layers of the laminate film being not less than 3, and the laminate film is formed by coextruding a gas-barrier resin, a thermoplastic resin and an adhesive composition consisting essentially of 100 parts by weight of a melt-extrudable adhesive resin and 0.1 to 50 parts by weight of a radiation-sensitive compound, and further irradiating onto the thus extruded laminate to cross-link the melt-extrudable adhesive resin.

As the gas-barrier resin preferably for use according to the present invention, copolymers of vinylidene chloride and another monomeric compound such as vinyl chloride and an alkyl acrylate, in which vinylidene chloride units predominate, saponified copolymers of ethylene and vinyl acetate and copolymers of acrylonitrile and an alkyl acrylate, in which acrylonitrile units predominate may be mentioned.

As the thermoplastic resin different from the gas-barrier resin, any melt-extrudable resin may be used without any limitations. For instance, polyolefins excellent in heat-sealability, represented by homopolymers of olefin such as polyethylene and polypropylene and by copolymers of olefin such as copolymer of ethylene or propylene and vinyl acetate in which ethylene units or propylene units predominate, polyamides excellent in mechanical properties such as nylon 6, nylon 66 and the like, polyesters such as polyethylene terephthalate and polybutylene terephthalate and other polymers such as poly(alkyl acrylate), polystyrene, poly(vinyl chloride), tripolymers of acrylonitrile, styrene and butadiene, tripolymers of methyl methacrylate, styrene and butadiene and polycarbonates may be used singly or as a mixture thereof. In addition, any gas-barrier resin may be used as the thermoplastic resin provided that it is different from the barrier resin used for the specified purpose.

Although the adhesive layer is disposed between the gas-barrier resin layer and the thermoplastic resin layer different therefrom, the laminate film according to the present invention may be prepared by laminating two thermoplastic resin layers as the outer layers onto a laminate comprising at least one gas-barrier resin layers and at least two adhesive resin layers. In other words, the indispensable condition of the laminate film according to the present invention is such that the adhesive layers is disposed between the gas-barrier resin layers and the thermoplastic resin layers different from the gas-barrier resin layers, and the laminate film may be any multi-laminate film having at least the above-mentioned laminate of the respective three layers.

As the laminate film according to the present invention, the following ones may be exemplified:

polyolefin layer/adhesive layer/vinylidene chloride copolymer layer; vinylidene chloride copolymer layer/ adhesive layer/polyamide layer; polyolefin layer/ adhesive layer/copolymer of ethylene and vinyl acetate layer/adhesive layer/polyolefin layer; saponified copolymer of ethylene and vinyl acetate layer/adhesive layer/polyester layer; polyolefin layer/ adhesive layer/copolymer of acrylonitrile and alkyl acrylate layer/adhesive layer/-polyolefin layer; and the like.

As the adhesive resin for use in the adhesive layer according to the present invention, any publicly known adhesive resin may be mentioned so far as it can be melt-extruded and is excellent in adhesion to the gas-barrier resin layer and the thermoplastic resin layer, and it is not necessary that the adhesive resin is easily reacted when irradiated. As the above-mentioned adhesive resin, one or more resins selected from the group consisting of the derivatives of poly(alpha-olefin), copolymers of alpha-olefin and vinyl acetate and derivatives thereof, copolymers of alpha-olefin and an unsaturated carboxylic acid and derivatives thereof, and block-copolymers of conjugated diene and aromatic vinyl compound and derivatives thereof are preferably used.

As the derivative of poly (alpha-olefin) for use according to the present invention, a copolymer obtained by graft-polymerization of an unsaturated carboxylic acid or an anhydride thereof to polyethylene or polypropylene, or a salt thereof is preferable.

As the derivative of copolymer of alpha-olefin and vinyl acetate, partially saponified copolymer of ethylene and vinyl acetate, the polymeric substance obtained by graft-polymerization of an unsaturated carboxylic acid or an anhydride thereof to the copolymer of ethylene and vinyl acetate or the partially saponified copolymer of ethylene and vinyl acetate or the salt of the thus obtained polymeric substance may be exemplified.

Further, as the copolymer of alpha-olefin and an unsaturated carboxylic acid or the derivative thereof, copolymer of ethylene and (meth)acrylic acid, copolymer of ethylene and an alkyl (meth)acrylate or copolymer obtained by graft-polymerization of an unsaturated carboxylic acid or an anhydride thereof to one of the above-mentioned copolymer or a salt thereof may be exem- plified.

As the preferable unsaturated carboxylic acid or an anhydride thereof, acrylic acid, methacrylic acid, maleic acid or maleic anhydride is used in a preferable amount of 0.01 to 5 % by weight of the polymeric substance to be subjected to graft polymerization.

Further, as the block-copolymer of conjugated diene and styrene or the derivative thereof, for instance, block-copolymer of butadiene and styrene, the product obtained by bringing the block-copolymer of butadiene and styrene into maleination with a derivative of maleic anhydride, represented by the formula:

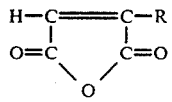

wherein R is a hydrogen atom, a methyl group or a phenyl group, and a polymeric substance obtained by the addition of at least one member selected from oxides and hydroxides of mono metal or divalent metal, mono metal or divalent metal salts of an organic acid and mono metal or divalent metal alkoxides to the above-mentioned product may be mentioned.

As the radiation-sensitive compound coexisting with the above-mentioned melt-extrudable adhesive resin in the adhesive layer, a compound which easily reacts to form a cross-linked state by a relatively low radiation dose absorbed thereby and difficultly decomposes to form bubbles or is scarcely cross-linked by thermal polymerization within the extruder is used. As such a compound, those having one to six functional groups, particularly one to four functional groups sensitive to radiation are preferable. In the case where the number of the functional groups in the molecule is more than seven, the intermolecular hydrogen bonds of the compound is so strong that the viscosity thereof at room temperature is very large, thus resulting in the demerits of unfavorable processability and of taking a long time for impregnating thereof into the adhesive resin. To be concrete, one or more member selected from acryloyl compounds or methacryloyl compounds of a molecular weight of more than 200, preferably from 200 to 1500 are used.

As the acryloyl compound or methacryloyl compound, an acrylate ester or methacrylate ester of an alcohol of a large molecular weight, or a diacrylate, dimethacrylate, triacrylate or trimethacrylate of a polyvalent alcohol of a large molecular weight is used. For instance, trimethylolpropane trimethacrylate (referred to as TMPTMA), neopentylglycol dimethacrylate (referred to as NPGDMA), monoacrylate ester (produced by Toa Gosei Chem. Co., Ltd., under the trade name of M 111) and diacrylates (produced by Nippon Kayaku Co., Ltd., under the trade names of MANDA, HX-620 and HX-220) are respectively used.

The characteristic properties of the radiation-sensitive compound according to the present invention are that the compound is effectively got into cross-linking by irradiating, however, it is hardly got into cross-linking by heating. The extent of cross-linking of the adhesive resin can be known by determining the gel fraction according to the method described later. The extent of cross-linking of the melt-extrudable adhesive resin by irradiating or heating is compared to those of other cross-linking agents in Table 1. Namely, the radiation-sensitive compound according to the present invention reacts very well by irradiation, however, is difficulty cross-linked by heating and accordingly, the composition consisting essentially of the melt-extrudable adhesive resin and the radiation-sensitive compound can be smoothly shaped into the adhesive layer without being gelled within the extruder. Furthermore, the acryloyl- and methacryloyl compound having a molecular weight of larger than 200 give only a small extent of odour by thermal evaporation thereof in the industrial extruding operation and it is a merit from the viewpoint of environmetal sanitation.

TABLE 1

| Radiation-sensitive compound or cross-linking agent added to the adhesive resin | | Gel fraction (%) by | | |
|---|---|---|---|---|
| Name | Molecular weight | Electron beam | Heat | Odor |
| Acryloyl compound | | | | |
| MANDA[1] | 326 | 82 | 5 | O |
| HX-620[2] | 768 | 71 | 1 | O |
| M 111 | 318 | 64 | 4 | O |
| Methacryloyl compound | | | | |
| TMPTMA | 338 | 63 | 2 | O |
| NPGDMA | 226 | 60 | 4 | O |
| Allyl compound | | | | |
| triallylbenzene | 330 | 6 | 85 | O |
| triallyl cyanurate | 249 | 3 | 11 | O |
| triallyl isocyanurate | 201 | 16 | 3 | Δ |
| Maleate | | | | |
| Methyl maleate | 130 | 32 | 1 | x |
| Mono-n-butyl maleate | 172 | 3 | 1 | x |
| Control (not added) | | 3 | 0 | O |

Notes:
[1] and [2], for the chemical structural formulae, refer to as follows.
[1]Structural formula of MANDA is as follows.

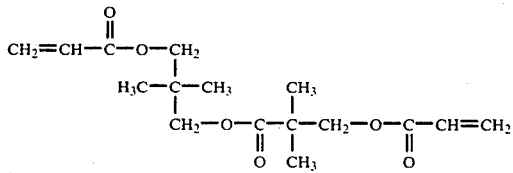

[2]Structural formula of HX-620 is as follows.

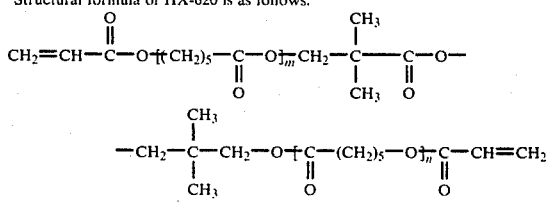

wherein m + n = 4

METHOD FOR DETERMINING GEL FRACTION

For an example, a composition prepared by impregnating a grafted copolymer of ethylene and ethyl acrylate (containing 15 % by weight of ethyl acrylate units and 0.2 % by weight of grafted maleic acid, and of a crystal melting point of 92° C.) with 2 parts by weight of a radiation-sensitive compound shown in Table 1 per 100 parts by weight of the grafted copolymer was extruded from a T-die of an extruder at 170° C. to be a film of 300 micrometers in thickness. The thus prepared film was subjected to the respective treatments of exposure to electron beam or to heat under the following respective conditions, and the gel fraction of the thus treated films was determined as follows.

The thus treated film was soaked in xylene at 97° C. for 10 min, and the undissolved residual material remaining after soaking was vacuum-dried for 24 hours at 70° C. The gel fraction was obtained from the following formula:

$$\text{Gel fraction (\%)} = \frac{W_2}{W_1} \times 100$$

wherein $W_1$ is the weight of the film before treatment and $W_2$ is the weight of the dried residual material.

Conditions in the Treatment by Electron Beam

The film specimen was exposed to electron beam in open air at room temperature until the absorbed dose became 2 Mrad.

Conditions in the Heat-Treatment

The film specimen was treated by a hot press at 300° C. for one hour.

Odor

Odor in Table 1 means the extent of the odor generated on the operation of extruding the laminate film as follows.

"O" means the extent of odor which can be reduced to the extent which is harmless to environmental sanitation by a relatively small scale of ventilation, "x" means that the odor is irritant and it is necessary to carry out a relatively large scale of ventilation, and "Δ" means the extent of odor which is between "O" and "x".

Such a radiation-sensitive compound is used in an amount of 0.1 to 50, preferably 1 to 20 parts by weight per 100 parts by weight of the above-mentioned melt-extrudable adhesive resin. The use of not more than 0.1 part by weight of the compound does not give the satisfiable state of cross-linking even after irradiating the film until absorbing a relatively large dose of 5 to 10 Mrad, and on the other hand, the use of over 50 parts by weight of the compound is apt to remain unreacted, cross-linked materials in the thus treated film. The thus remained unreacted, cross-linked materials are bled from the resin layer and are apt to be maldistributed in the interface of the thus treated adhesive layer, thereby causing the reduction of adhesion of the adhesive layer.

The radiation-sensitive compound is admixed with the adhesive resin by impregnating the resin therewith.

Although the radiation-sensitive compound according to the present invention is stable against heat, it is preferable to add a small amount of a polymerization-inhibitor into the adhesive resin in the case where extrusion is carried out under severe shaping conditions, for the purpose of preventing the gelation at the time of thermal melt-extrusion. As the polymerization-inhibitor, various polymerization-inhibitors may be used, for instance, hydroquinone, hydroquinone monomethyl ether, hydroquinone dimethyl ether, hydroquinone mono-n-propyl ether, tert-butylhydroquinone, 2,5-di-tert-butylhydroquinone, catechol and phenothiazine.

In the preparation of the laminate film according to the present invention, (i) the gas-barrier resin, the thermoplastic resin and the adhesive composition are coextruded according to the publickly known process while using a number of extruders corresponding to the total number of the layers constructing the laminate film from, for instance, a common T-die as a flat laminate film or preferably, a common circular die as a tubular laminate film, and (ii) the thus coextruded, flat laminate film or tubular laminate film is irradiated. In certain circumstance, before irradiating, the coextruded tubular laminate film is biaxially stretched simultaneously into the diametric direction and the direction of film-flowing by biaxial inflation, or the coextruded flat laminate film is once stretched in the direction of film-flowing between two rolls and then successively stretched in the direction of the width of the film by a tentor or biaxially stretched simultaneously in these directions by a tentor.

As the radiation for use according to the present invention, alpha-ray, beta-ray, gamma-ray and electron beam may be mentioned, and as the electron beam, that of an energy in a range of from 5 to 3000 KeV emitted from various electron accelerators such as those of CockcroftWalton type, Van de Graaf type, resonance transformer type, insulated core transformer type, linear type, dynamitron type and cyclotron of high frequency type is used. As the dose of radiation, those in a range of from 0.3 to 5 Mrad are preferable. The radiation dose not more than 0.3 Mrad cannot cause the sufficient cross-linking for the purpose, and on the other hand, the dose over 5 Mrad is in danger of causing coloration of the gas-barrier resin layer(s) due to decomposition thereof. In the radiation treatment, one or both sides of the laminated film are irradiated.

By such a radiation treatment, the radiation-sensitive compound in the adhesive composition of the laminate film is reacted to form cross-linking, thereby the heat-resistance of the adhesive resin is improved.

It is considered that since the radiation-sensitive compound is cross-linked by irradiating, the adhesive resin is wrapped in the thus formed cross-linked material in a hardly movable state resulting in the improvement of the heat-resistance of the laminate film.

In the step of irradiating onto the thus coextruded laminate just after coextruding or after biaxially stretching thereof, the thickness of the laminate is relatively thin and is in a range of from 1 to 600 micrometers and accordingly, the sufficient cross-linking in the adhesive resin layer is possibly effected even by a small radiation dose resulting in a merit of not damaging the thermoplastic resin and the gas-barrier resin in the radiation-exposed laminate film.

It is preferable that the thickness of the laminate film according to the present invention is in a range from 10 to 200 micrometers, that the total sum of the thickness of the adhesive layers is in a range from 1 to 20 % of the total thickness of all the layers constituting the laminate film and that the thickness of the adhesive layer is preferably in a range from 0.1 to 40 micrometers.

The thus prepared laminate film according to the present invention is sufficiently oil-resistant and heat-resistant in enduring the high-temperature sterilization treatment of oily and fatty foodstuffs packaged therein, and can be used in various forms such as films and sheets.

The laminate film according to the present invention will be explained more in detail while referring to the following non-limitative examples and, in addition, the properties of the laminate film shown in the examples have been measured by the following methods.

(1) Evaluation of the Appearance of the Laminate Film

In a packaging bag prepared from the tubular laminate film according to the present invention by heat-sealing one end thereof, blocks of roast pork containing a large amount of oils and fats and having irregular appearance were packaged, and after heat-sealing the other end of the bag, it was soaked for 10 min in a hot water at 90° C. and thereafter, the appearance of the thus treated packaged bag was observed. The extent of the occurrence of fine wrinkles observed on the film surface was classified into 5 ranks (A to E) according to the standards shown in Table 2.

TABLE 2

| Rank | Extent of occurrence of fine wrinkles |
|---|---|
| A | Fine wrinkles were not observed at all. |
| B | Only one or two fine wrinkles were observed. |
| C | Fine wrinkles were observed locally. |
| D | Fine wrinkles were observed all over the film surface and partial interlayer exfoliation was observed. |
| E | Fine wrinkles and interlayer exfoliation were observed all over the film surface. |

(2) Determination of the Extent of Haziness (Haze %) of the Surface of the Laminate Film From a laminate film prepared according to the present invention, ten test pieces were cut out and divided into two groups each consisting of five test pieces. The extent of haziness of each of the five pieces of the first group was directly determined by a Haze-meter (made by Tokyo Denshoku Co., Ltd., model TC-H III) as a Haze (%) according to the method in ASTM D-1003-61, and the mean value thereof was designated the Haze (%)of the laminate film. The five pieces of the second group were respectively floated for 10 min on the surface of hot water at 90° C. to which a small amount of lard had been added, and after taking out from the hot water and removing the lard adhered to the surface thereof, the extent of haziness of the thus treated piece was measured as above, the mean value of Haze (%) was designated as the Haze (%) of the thus treated laminate film. In the case where the Haze (%) of the thus treated laminate film is not higher than 10, it is considered that the laminate film is suitable for practical use of packaging a fatty and oily foodstuff.

The present invention is explained in more detail in the following Examples; however, it should be recognized that the scope of the present invention is not restricted to these Examples.

EXAMPLE 1

A tubular 5-ply laminate film consisting of an outermost layer of a mixture of 60 % by weight of a copolymer of ethylene and vinyl acetate (crystal melting point of 98° C.) and 40 % by weight of a polyethylene of crystal melting point of 120° C., an adhesive layer of an adhesive resin composition prepared by mixing 2 parts by weight of a diacrylate (MANDA, made by Nippon Kayaku Co., Ltd.) as a radiation-sensitive compound and 0.0001 part by weight of hydroquinone monomethyl ether as a polymerization inhibitor with 100 parts by weight of a grafted copolymer of ethylene and ethyl acrylate by maleic acid (containing 15 % by weight of ethyl acrylate units and 0.2 % by weight of maleic acid units, and crystal melting point of 92° C.) and subjecting the mixture to impregnation at 50° C., a core layer of a copolymer of vinylidene chloride and vinyl chloride (Krehalon, made by Kureha Chem. Ind. Co., Ltd.), another adhesive layer of the same adhesive resin as above and an innermost layer of the same composition as the outermost layer in the above-mentioned order was melt-coextruded from a common circular die according to a conventional process, and the thus obtained tubular laminate was biaxially stretched simultaneously by the inflation method to be a folded, tubular heat-shrinkable laminate film of 450 mm in folded width, 50 micrometers in thickness and 2 micrometers in total thickness of the two adhesive layers.

Then, the thus obtained heat-shrinkable laminate film was irradiated in a folded state onto a ruster-operated electron beam (500 KeV, currency of 1 mA) from a low energy type electron accelerator (made by Nisshin High Voltage Co., Ltd. type EPS-750) on one side thereof in open air until the absorbed radiation dose amounted to Mrad so as to cross-link the adhesive layers consisting of the specified resin composition relatively heavier than the other layers of the laminate film while keeping the laminate film in running at a speed of 12 m/min, thereby obtaining the laminate film according to the present invention.

After preparing packaging bags by cutting the thus obtained tubular laminate film to a predetermined length and heat-sealing one of the ends of the thus cut pieces, irregular shaped blocks of roast pork containing a large amount of oils and fats were packed in the thus prepared bags, and after heat-sealing the other end thereof, the packaged roast pork was soaked in hot water at 90° C. for 10 min.

The result of examination of the appearance of the thus treated packaged roast pork is shown in Table 3 together with the result of determination of Haze(%)of the lard-water treated laminate film. The Haze(%)of the laminate film before subjecting the lard-water treatment was 1.

As are seen in Table 3, any occurrence of fine wrinkles due to the interlayer sliding and peeling was not observed and the increase of Haze (%) due to the increased thickness of the film by heat-shrinkage thereof was slight enough.

Namely, a large effect of the cross-linking of the adhesive layer in improving the heat-resistance and oil-resistance of a laminate film including the adhesive layers, according to the present invention, was confirmed.

EXAMPLE 2

A heat-shrinkable tubular laminate film of the same constitution as in Example 1 except for using 2 parts by weight of trimethylolpropane trimethacrylate (TMPTMA, made by Nippon Kayaku Co., Ltd.) instead of the diacrylate (MANDA) in Example 1 was prepared by quite a similar process to that in Example 1, and the thus obtained heat-shrinkable film was irradiated by the electron beam in the same manner as in Example 1 to obtain a folded, tubular laminate film according to the present invention.

The heat-resistance and oil-resistance of the thus obtained laminate film was examined in the same manner as in Example 1, the results being shown in Table 3.

As are seen in Table 3, any occurrence of fine wrinkles was not recognized on the test piece with a slight increase of Haze (%) thereof.

EXAMPLES 3 and 4

The respective two laminate films according to the present invention were prepared by the same manner as in Example 1 except for using 30 parts by weight of MANDA in Example 3 and 30 parts by weight of NPGDMA in Example 4 instead of 2 parts by weight of MANDA in Example 1.

The heat-resistance and oil-resistance of the thus obtained laminate films according to the process of the present invention were examined in the same manner as in Example 1, the results being shown in Table 3. As are seen in Table 3, both the laminate films obtained respectively in Examples 3 and 4 showed excellent results.

EXAMPLE 5

A laminate film according to the present invention was prepared in the same manner as in Example 1 except for using a copolymer of ethylene and ethyl acrylate (containing 15 % by weight of ethyl acrylate units, and showing a crystal melting point of 92° C.) as an adhesive resin in the adhesive layer instead of the grafted copolymer of ethylene and ethyl acrylate by maleic acid in Example 1. The results of examination of the heat-and oil-resistance of the thus obtained laminate film were, as are seen in Table 3, excellent.

COMPARATIVE EXAMPLE 1

After preparing packaging bags from the heat-shrinkable laminate film obtained in Example 1 without being irradiated by the electron beam and packaging the same kind of roast pork thereinto, the packaged roast pork was subjected to the same examination was in Example 1. As are seen in Table 3, fine wrinkles were observed all over the surface of the packing film, and the increase of Haze (%) was also large, thus damaging the commercial quality of the packaged goods to a large extent.

COMPARATIVE EXAMPLE 2

The operation for preparing a laminate film in a manner possibly as the same as that in Example 1 except for using 70 parts by weight of a radiation-sensitive compound (MANDA) instead of 2 parts by weight thereof was carried out. In this Comparative Example 2, it took a remarkably longer time to impregnate the adhesive resin composition, and on inflating the coextruded laminate, the melt viscosity of the adhesive layer became higher than those of the other layers of the laminate film by more than 10 times resulting in the formation of melt-flucture. In addition, on irradiating electron beam onto the coextruded and inflated laminate film, the interlaminer strength was much reduced by the segregation of the unreacted radiation-sensitive compound on the interface of the adhesive layer. Accordingly, after examination of heat-resistance as in Example 1, occurrence of the fine wrinkles was observed as are seen in Table 3 with the remarkable increase of Haze (%).

COMPARATIVE EXAMPLE 3

The operation for preparing the laminate film which had the same construction as in Example 1 except for using 0.01 part by weight of the same radiation-sensitive compound (MANDA) instead of 2 parts by weight thereof in Example 1 was carried out in the same manner as in Example 1. In this case, the state of cross-linking obtained under the same radiation conditions was insufficient for exhibiting the improved heat-resistance of the adhesive layers.

Accordingly, as are seen in Table 3, fine wrinkles occurred all over the surface of the laminate film, and the Haze (%) showed a remarkable increase.

Furthermore, in another case where the heat-shrinkable laminate film obtained in Comparative Example 3 was exposed to radiation of increased dose of 20 Mrad, although the thus obtained laminate film showed only a slight occurrence of the fine wrinkles, the copolymer of vinylidene chloride and vinyl chloride of the core layer was colored by the decomposition thereof, thus resulting in damaging the commercial value of the packaged goods.

EXAMPLE 6

A tubular 5-ply laminate film consisting of an outermost layer of a mixture of 80 parts by weight of the same copolymer of ethylene and vinyl acetate as in Example 1 and 20 parts by weight of a copolymer of propylene and ethylene containing 4 % by weight of ethylene units, an adhesive layer of an adhesive resin composition prepared by mixing 2 parts by weight of a monoacrylate ester (made by Toa Gosei Chem. Ind. Co., Ltd., under the trade name of M 111) with 100 parts by weight of a grafted copolymer of ethylene and vinyl acetate by maleic acid (made by Mitsui Petrochem. Ind. Co., Ltd. under the trade name of Admer. NF 500) and impregnating the mixture at 50° C., the core layer of a saponified copolymer of ethylene and vinyl acetate (made by KURARE Co., Ltd. under the trade name of EVAL:EP-E), another adhesive layer of the same adhesive resin composition as above and an innermost layer of a mixture of 60 parts by weight of the above-mentioned copolymer of ethylene and vinyl acetate and 40 parts by weight of the same polyethylene as in Example 1 in the above-mentioned order was melt-coextruded from a common circular die according to a conventional process, and the thus obtained tubular laminate film was biaxially stretched as in Example 1 to obtain a folded, heat-shrinkable tubular laminate film of 450 mm in folded width, 100 micrometers in thickness and 10 micrometers in the total sum of the thickness of the two adhesive layers. Thereafter, the thus obtained folded, heat-shrinkable tubular laminate film was exposed to electron beam in the same manner as in Example 1 to obtain the laminate film according to the present invention, the results of examination of the heat-resistance and oil-resistance carried out in the same manner as in Example 1 are shown in Table 3.

EXAMPLE 7

A laminate film according to the present invention was prepared by the same procedures as in Example 1 except for using a copolymer highly containing acrylonitrile units (made by Mitsui-Toatsu Chem. Ind. Co., Ltd. under the trade name of Barex #210) in the core layer instead of the copolymer of vinylidene chloride and vinyl chloride in Example 1. As the results of examination of the heat-resistance and oil-resistance of the thus prepared laminate film carried out in the same manner as in Example 1, the occurrence of the fine wrinkles was never recognized, and the increase of the Haze (%)was very slight and transient due to the recoverable absorption of water by the laminate film.

Thus, it was possible to confirm the remarkable effect of cross-linking of the adhesive layer according to the present invention in improving the heat-resistance and oil-resistance of a laminate film.

EXAMPLE 8

A laminate film according to the present invention was prepared in the same manner as in Example 1 except for using a copolymer of ethylene and methacrylic acid containing 9 % by weight of methacrylic acid units and showing a crystal melting point of 97° C. as an adhesive resin in the adhesive layer instead of the grafted copolymer of ethylene and ethyl acrylate by maleic acid.

The results of examination of the heat-resistance and oil-resistance of the thus obtained laminate film in the same manner as in Example 1 were, as are seen in Table 3, excellent.

EXAMPLE 9

A laminate film according to the present invention was prepared in the same manner as in Example 1 except for using a block-copolymer of styrene and butadiene (made by Nippon Elastomer Co., Ltd. under the registered trade name of SORPRENE T of a softening point of 80° C.) as an adhesive resin in the adhesive layer instead of the grafted copolymer of ethylene and ethyl acrylate by maleic acid in Example 1. The thus obtained laminate film showed the excellent results in the heat-resistance and oil-resistance test carried out as in Example 1, as are shown in Table 3.

EXAMPLE 10

A non-stretched, laminate film having the same constitution as in Example 5 was prepared by coextrusion from a common circular die and simultaneous melt-inflation. The thus obtained relatively thin film of 600 micrometers in thickness was irradiated by the electron beam in the same manner as in Example 1 except for using a currency of 14 mA instead of 1 mA in Example 1 to obtain a laminate film according to the present invention. After preparing packaging bags as in Example 1 and packaging the same kind of irregular shaped blocks of roast pork, the packaged roast pork was soaked in hot water at 90° C. for 10 min to examine the appearance of the thus treated packaged roast pork as in Example 1, the results of examination being shown in Table 1. As are seen in Table 3, any occurrence of fine wrinkles was not observed, and the result of lard hot water treatment showed a slight increase of Haze (%), namely, the Haze (%) of the untreated laminate film of Example 10 being 3.

TABLE 3

| Example or Comparative Example | Extent of observable fine wrinkles | Haze (%) after lard-hot water treatment[1] |
| --- | --- | --- |
| Example 1 | A | 2 |
| Example 2 | A | 2 |
| Example 3 | A | 3 |
| Example 4 | A | 3 |
| Example 5 | B | 7 |
| Example 6 | B | 8 |
| Example 7 | A | 4 |
| Example 8 | B | 6 |
| Example 9 | B | 7 |
| Example 10 | A | 7 |
| Comparative Example 1 | D | 25 |
| Comparative Example 2 | C | 15 |
| Comparative Example 3 | D | 22 |

Note:
The Haze (%) of the laminate film obtained in Examples 2 to 9 before the lard-hot water treatment was 1.

What is claimed is:

1. A heat-resistant and oil-resistant laminate film comprising:
   (1) a gas-barrier resin layer, the resin of which is a copolymer of vinylidene chloride, a saponified copolymer of ethylene and vinyl acetate, or a copolymer of acrylonitrile;
   (2) a thermoplastic resin layer different from the gas-barrier resin; and
   (3) an adhesive layer disposed between the said gas-barrier resin layer and the said thermoplastic resin layer;
   wherein the said laminate film is produced by co-extruding the gas-barrier resin, the thermoplastic resin and the adhesive layer composition and irradiating the co-extruded laminate, and wherein the total number of the layers of the laminate film is not less than 3; and
   wherein (i) the adhesive layer comprises a cross-linked polymer and (ii) the adhesive layer composition consists essentially of 100 parts by weight of a melt-extrudable adhesive resin and 0.1 to 50 parts by weight of a radiation sensitive compound, which is at least one member selected from the group consisting of acryloyl compounds and methacryloyl compounds having each a molecular weight of more than 200 and two to six functional groups.

2. The heat-resistant and oil-resistant laminate film according to claim 1, wherein the said melt-extrudable resin compirses one or more resins selected from the group consisting of the derivatives of alpha-olefin polymers, copolymers of alpha-olefin and vinyl acetate and derivatives thereof, copolymers of alpha-olefins and an unsaturated carboxylic acids and derivatives thereof, and block-copolymers of conjugated dienes and an aromatic vinyl compounds and derivatives thereof.

3. The heat-resistant and oil-resistant laminate film according to claim 1, wherein the said adhesive layer contains a polymerization-inhibitor.

4. The heat-resistant and oil-resistant laminate film according to claim 1, wherein the said heat-resistant and oil-resistant laminate film consists of the following five layers in the following order: a thermoplastic resin layer/an adhesive layer cross-linked by radiation/a gas-barrier resin layer/another adhesive layer cross-linked by radiation/another thermoplastic resin layer.

5. The heat-resistant and oil-resistant laminate film according to claim 1, wherein the said heat-resistant and oil-resistant laminate film is heat-shrinkable.

6. The heat-resistant and oil-resistant laminate film of claim 1, wherein the said radiation sensitive compound is at least one member selected from the group consisting of triemthylolpropane trimethacrylate, and neopentylglycol dimethacrylated.

7. A process for preparing a heat-resistant and oil-resistant laminate film) comprising the steps of
   co-extruding (1) a gas-barrier resin which is a copolymer of vinylidene chloride, a saponfied copolymer of ethylene and vinyl acetate, or a copolymer of acrylonitrile, (2) a thermoplastic resin, and (3) an adhesive composition consisting essentially of 100 parts by weight of a melt-extrudable adhesive resin and 0.1 to 50 parts by weight of radiation-sensitive compound, which is at least one member selected from the group consisting of acryloyl compounds and methacryloyl compounds, each having a molecular weight of more than 200 and two to six functional groups, in a configuration wherein an adhesive layer is disposed between a gas-barrier resin layer and a thermoplastic resin layer, thereby forming a multi-layered laminate consisting of not less than three layers, and irradiating the thus formed multi-layered laminate to cross-link the melt-extrudable adhesive composition.

8. The process according to claim 7, wherein the said melt-extrudable adhesive resin comprises one or more resins selected from the group consisting of the derivatives of alpha-olefin polymers, copolymers of alpha-olefins and vinyl acetate and derivatives thereof, copolymers of alpha-olefins and an unsaturated carboxylic acids and derivatives thereof and block-copolymer of conjugated dienes and an aromatic vinyl compounds and derivatives thereof.

9. The process according to claim 7, wherein the said adhesive layer contain a polymerization-inhibitor.

10. The process according to claim 7, wherein the said heat-resistant and oil-resistant laminate film consists of the following five layers in the following order: a thermoplastic resin layer/an adhesive layer cross-linked by radiation/a gas-barrier resin layer/another adhesive layer cross-linked by radiation/another thermoplastic resin layer.

11. The process according to claim 7, wherein the said multi-layered film thus coextruded is biaxially stretched before being exposed to radiation.

12. The process for preparing a heat-resistant and oil-resistant laminate film according to claim 7, wherein the said radiation sensitive compound is at least one member selected from the group consisting of trimethylolpropane triemthacrylate and neopentylglycol dimethacrylate.

* * * * *